United States Patent
Zhou et al.

(10) Patent No.: US 10,871,501 B2
(45) Date of Patent: Dec. 22, 2020

(54) WHEEL SPEED SENSOR WITH INTEGRATED CLAMPING SLEEVE

(71) Applicant: Bendix Commercial Vehicle Systems LLC, Elyria, OH (US)

(72) Inventors: Nianqing Zhou, Avon, OH (US); Daniel Peter Zula, North Ridgeville, OH (US); Jack Dunlap Mason, Pine Valley, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 272 days.

(21) Appl. No.: 16/220,042

(22) Filed: Dec. 14, 2018

(65) Prior Publication Data

US 2020/0191820 A1   Jun. 18, 2020

(51) Int. Cl.
*G01P 3/487* (2006.01)
*B60B 27/00* (2006.01)
*B60T 8/32* (2006.01)

(52) U.S. Cl.
CPC .......... *G01P 3/487* (2013.01); *B60B 27/0068* (2013.01); *B60T 8/329* (2013.01)

(58) Field of Classification Search
CPC . G01P 3/487; G01P 1/00; G01P 1/026; B60B 27/0068; B60T 8/329
See application file for complete search history.

(56) References Cited

U.S. PATENT DOCUMENTS

| | | | |
|---|---|---|---|
| 6,283,150 B2* | 9/2001 | Apel | F02D 9/105 137/554 |
| 6,463,818 B1 | 10/2002 | Stagg et al. | |
| 6,523,425 B1 | 2/2003 | Kubik | |
| 6,792,650 B2 | 9/2004 | Stagg et al. | |
| 9,482,245 B2 | 11/2016 | Palmer et al. | |
| 9,921,236 B2 | 3/2018 | Dalisdas et al. | |
| 10,717,323 B2* | 7/2020 | Yang | B60T 8/171 |
| 2006/0254354 A1 | 11/2006 | Maes | |
| 2011/0023265 A1 | 2/2011 | Singbartl | |

(Continued)

FOREIGN PATENT DOCUMENTS

| | | |
|---|---|---|
| DE | 3229207 C2 | 4/1984 |
| DE | 8815130 U1 | 3/1989 |

(Continued)

OTHER PUBLICATIONS

English language machine translation of DE 8815130 U1.
(Continued)

*Primary Examiner* — Freddie Kirkland, III
(74) *Attorney, Agent, or Firm* — Reising Ethington P.C.

(57) ABSTRACT

A wheel speed sensor includes a housing having a longitudinal axis. The housing receives a speed measurement instrument and faces an exciter ring upon insertion into an opening in a sensor mounting block spaced from the excite ring such that the instrument senses rotation of the exciter ring. A plurality of springs are mounted in the housing and project radially outwardly therefrom with at least a subset of the springs engaging a surface of the opening in the sensor mounting block. Each spring has first and second ends over molded by the housing and an intermediate section between the first and second ends spaced from a radially outer surface of the housing.

21 Claims, 4 Drawing Sheets

(56) References Cited

U.S. PATENT DOCUMENTS

2015/0331005 A1* 11/2015 Dalisdas ................ G01P 3/488
  701/72
2018/0112698 A1   4/2018 Kluftinger et al.
2020/0200786 A1*  6/2020 Biebricher ............... G01P 1/00

FOREIGN PATENT DOCUMENTS

EP        1896733 B1    3/2010
WO    2016/162551 A1   10/2016

OTHER PUBLICATIONS

English language machine translation of DE 3229207 C2.
English language abstract of DE 10 2005 030 435 (from which EP 1896733 B1 claims priority).
English language machine translation of WO 2016/162551 A1.

* cited by examiner

000
WHEEL SPEED SENSOR WITH INTEGRATED CLAMPING SLEEVE

BACKGROUND OF THE INVENTION a. Field of the Invention

This disclosure relates to wheel speed sensors. In particular, this disclosure relates to a wheel speed sensor having a configuration that allows the sensor to be mounted within an opening in a sensor mounting block without the use of a separate clamping sleeve.

b. Background Art

Conventional vehicles include wheel speed sensors that generate signals indicative of the speed of individual wheels on the vehicle. The wheel speed information is used for a variety of purposes including providing an indication of vehicle speed to the vehicle operator through a dashboard or other interface and in the control of anti-lock braking systems and stability control systems. Referring to FIG. 1, a conventional wheel speed sensor assembly includes an exciter ring 10 (sometimes referred to as a "tone wheel") that is mounted to the wheel hub for rotation with the vehicle wheel, and a wheel speed sensor 12 positioned within an opening 14 in a sensor mounting block 16 on the vehicle axle and spaced from the exciter ring 10. The exciter ring 10 defines a plurality of regularly spaced teeth 18 and rotation of the exciter ring 10 relative to the stationary sensor 12 causes a change in current and/or voltage in sensor 12 as the teeth of ring 10 move past the sensor 12 thereby providing an indication of the change in rotational position of the wheel hub. The sensor 12 is secured within the mounting block 16 using a metal clamping sleeve 20 that is inserted into the opening 14 in the mounting block 16 prior to the sensor 12 and that establishes a spring force between the outer surface of the sensor 12 and the inner surface of the opening 14 to inhibit movement of the sensor 12 relative to the mounting block 16.

The above-described sensor assembly has performed well for its intended purpose. Nevertheless, the assembly has several drawbacks. In particular, the assembly requires manufacturing and maintaining two different parts—the sensor 12 and clamping sleeve 20—resulting in increased costs for design, manufacturing and inventory management. In addition, installation of the assembly consumes an undesirable amount of time because the installer must first insert and properly position the clamping sleeve 20 within the sensor mounting block 16 before inserting the sensor 12 into the clamping sleeve 20. Once the clamping sleeve 20 is installed, it can also be very difficult to remove the clamping sleeve 20—particularly with the impact of corrosion over time. As a result, when it is necessary to replace the sensor 12, maintenance personnel will often leave an old clamping sleeve 20 in place and replace only the sensor 12 while discarding the new clamping sleeve 20. In addition to a waste of resources, this action may harm the performance of the sensor 12 because the old clamping sleeve 20 may not be able to maintain the sensor 12 in the appropriate position within the mounting block 16.

The inventors herein have recognized a need for a wheel speed sensor that will minimize and/or eliminate one or more of the above-identified deficiencies.

BRIEF SUMMARY OF THE INVENTION

This disclosure relates to wheel speed sensors. In particular, this disclosure relates to a wheel speed sensor having a configuration that allows the sensor to be mounted within an opening in a sensor mounting block without the use of a separate clamping sleeve.

A wheel speed sensor in accordance with one embodiment includes a housing having a longitudinal axis. The housing is configured to receive a speed measurement instrument therein and to face an exciter ring upon insertion into an opening in a sensor mounting block spaced from the exciter ring such that the speed measurement instrument senses rotation of the exciter ring. The wheel speed sensor further includes a plurality of springs mounted in the housing and projecting radially outwardly from the housing. At least a subset of the plurality of springs is configured to engage a surface of the opening in the sensor mounting block upon insertion of the housing into the opening. Each of the plurality of springs has first and second ends over molded by the housing and an intermediate section between the first and second ends spaced from a radially outer surface of the housing.

A wheel speed sensor assembly in accordance with one embodiment includes an exciter ring mounted to a wheel hub supporting a wheel of a vehicle and a wheel speed sensor mounted in an opening in a sensor mounting block on an axle supporting the wheel hub. The wheel speed sensor includes a housing having a longitudinal axis. The housing is configured to receive a speed measurement instrument therein and to face, and be spaced from, the exciter ring such that the speed measurement instrument senses rotation of the exciter ring. The wheel speed sensor further includes a plurality of springs mounted in the housing and projecting radially outwardly from the housing. At least a subset of the plurality of springs engages a surface of the opening in the sensor mounting block. Each of the plurality of springs has first and second ends over molded by the housing and an intermediate section between the first and second ends spaced from a radially outer surface of the housing.

A method of forming a wheel speed sensor in accordance with one embodiment includes the step of positioning a speed measurement instrument and a plurality of springs within a fixture such that the plurality of springs surround the speed measurement instrument and each of the plurality of springs is spaced from every other one of the plurality of springs. The method further includes the step of over molding the speed measurement instrument and the plurality of springs to form a wheel speed sensor having a housing having a longitudinal axis. The housing receives the speed measurement instrument therein. The housing further mounts the plurality of springs such that the plurality of springs project radially outwardly from the housing for engagement with a surface of an opening in a sensor mounting block proximate an exciter ring upon insertion of the housing into the opening. Each of the plurality of springs has first and second ends over molded by the housing and an intermediate section between the first and second ends spaced from a radially outer surface of the housing.

A wheel speed sensor in accordance the present teachings represent an improvement as compared to conventional wheel speed sensors. In particular, the sensor eliminates the need for a separate clamping sleeve to maintain the position of the sensor within the sensor mounting block. As a result, the sensor may reduce costs associated with design, manufacturing and inventory management of the sensor relative to conventional designs. Further, the sensor facilitates more rapid installation of the sensor by installers who no longer need to install a separate clamping sleeve prior to installation of the sensor. The sensor also eliminates the problem of removing old, and oftentimes corroded, clamping sleeves when it is necessary to replace a sensor thereby facilitating maintenance of the sensors and insuring more consistent sensor operation of the sensor.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
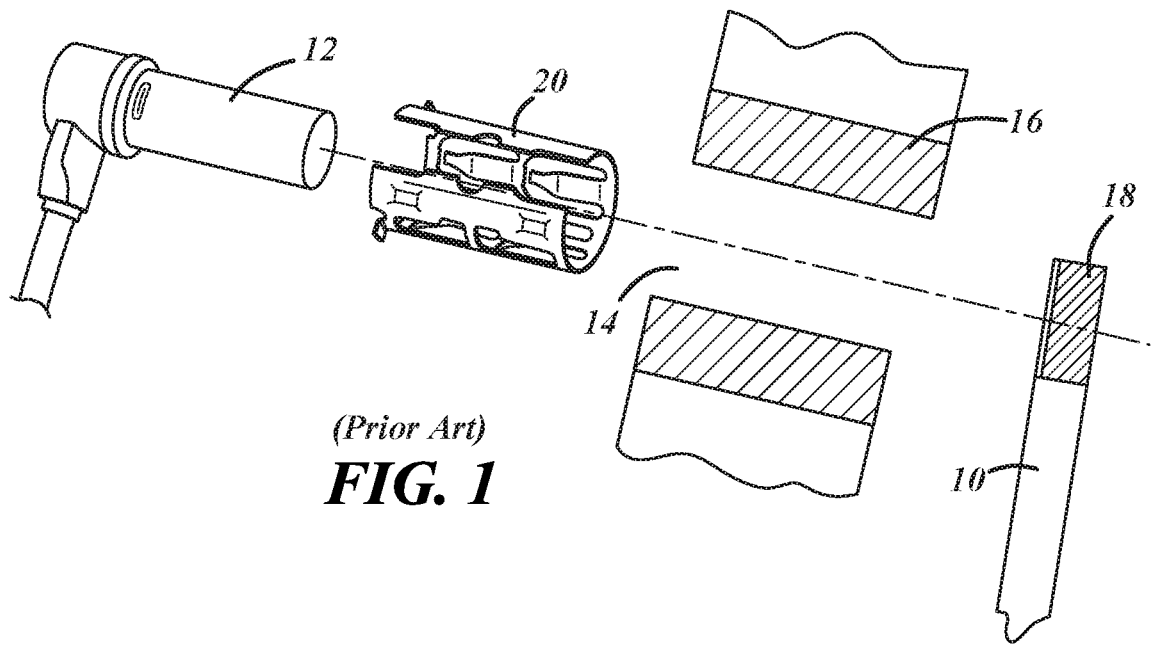
FIG. 1 is an exploded view of a prior art wheel speed sensor assembly.
Figure 2:
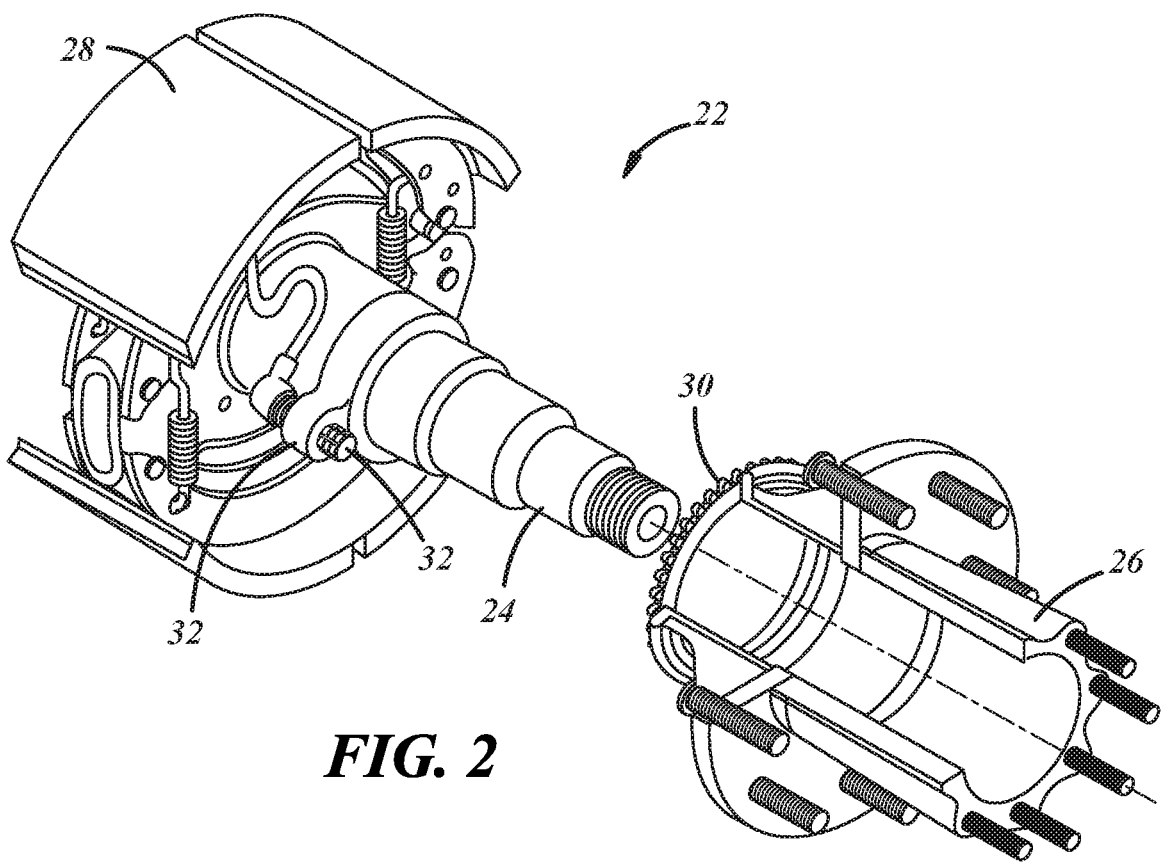
FIG. 2 is a perspective view of a vehicle wheel assembly incorporating a wheel speed sensor assembly in accordance with the present teachings.
Figure 3:
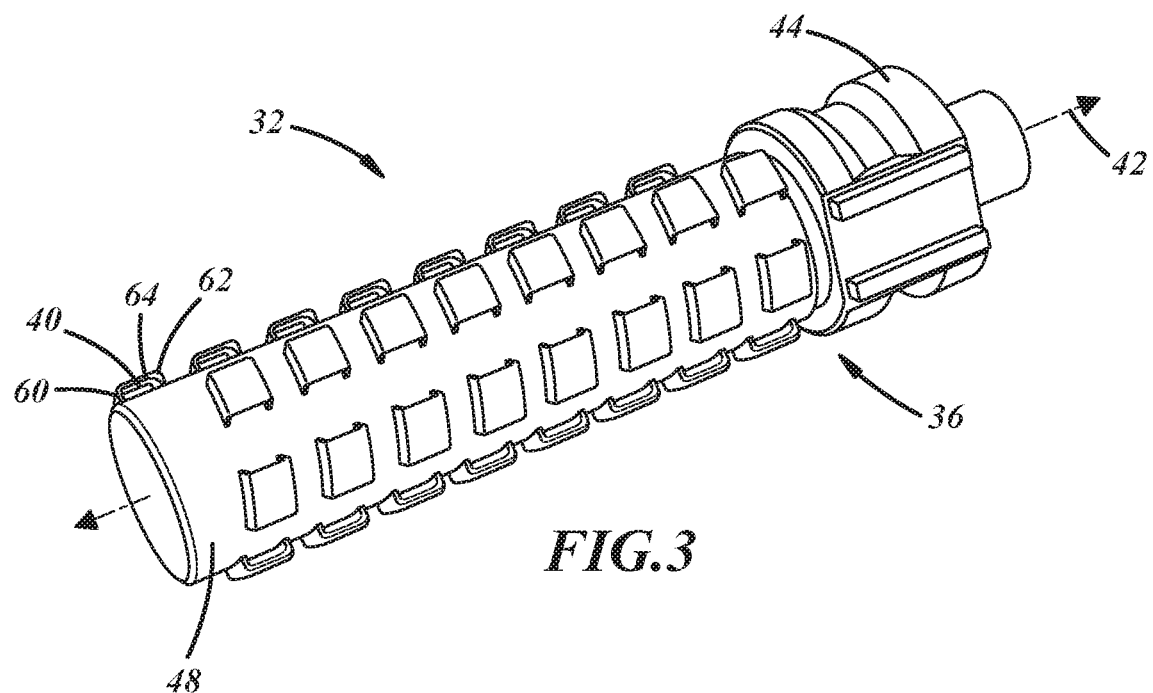
FIG. 3 is a perspective view of one embodiment of a wheel speed sensor.
Figure 4:
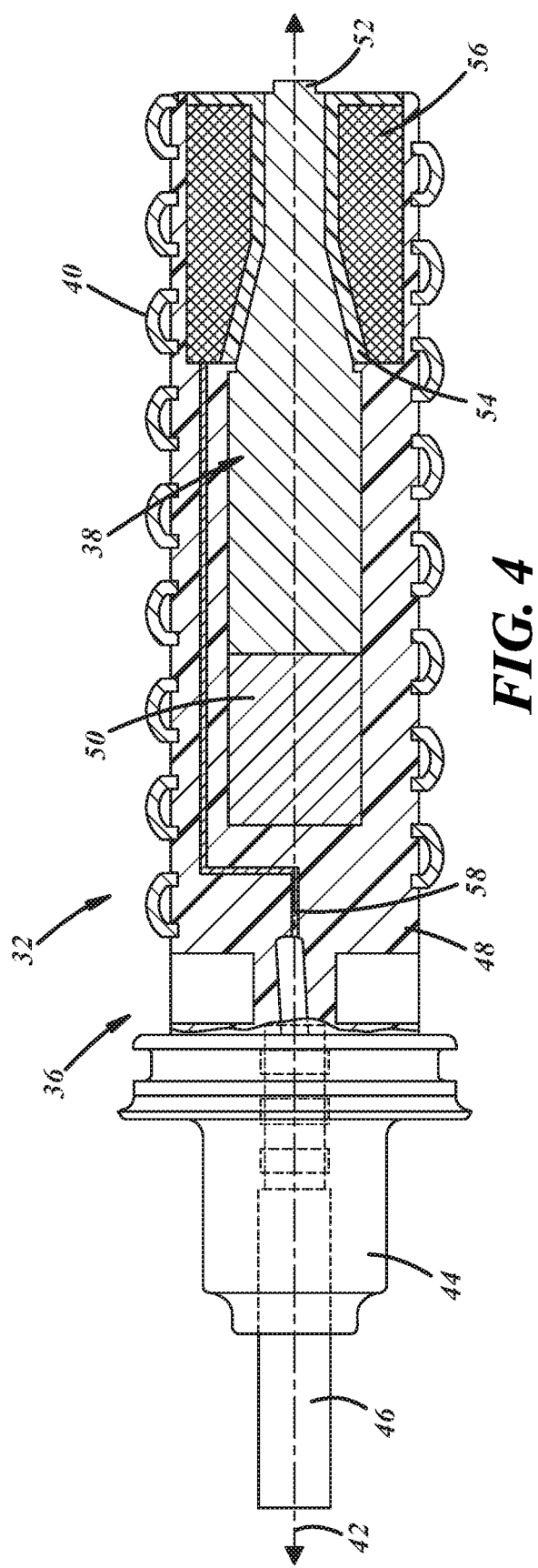
FIG. 4 is a cross-sectional view of the wheel speed sensor of FIG. 3.

Referring now to the drawings wherein like reference numerals are used to identify identical components in the various views, FIG. 2 illustrates a portion of a vehicle wheel assembly 22 incorporating a wheel speed sensor assembly in accordance with the present teachings. Assembly 22 includes an axle 24 and a wheel hub 26 that supports a vehicle wheel (not shown). The wheel hub 26 is rotatably supported on axle 24 by wheel bearings (not shown). Assembly 22 may further include a wheel brake 28 which takes the form of a drum brake in the illustrated embodiment. The operation of wheel brake 28 may be controlled, in part, responsive to signals generated by the wheel speed sensor assembly. The wheel speed sensor assembly is provided to measure the speed of rotation of the vehicle wheel. The wheel speed sensor assembly includes an exciter ring 30 (sometimes referred to as a "tone wheel") that is fixed to hub 26 for rotation therewith. In some embodiments, the exciter ring 30 defines a plurality of metallic teeth. In other embodiments, the exciter ring 30 may comprise a magnetic encoder with a plurality of magnets of alternating polarity supported on the ring 30. The wheel speed sensor assembly further includes a wheel speed sensor 32 that is inserted into an opening in a sensor mounting block 34 on axle 24 and thereby positioned relative to exciter ring 30 such that sensor 32 detects rotation of exciter ring 30 relative to sensor 32. Referring now to FIGS. 3-4, sensor 32 will be described in greater detail. In accordance with one embodiment, wheel speed sensor 32 may include a housing 36, a speed measurement instrument 38, and a plurality of springs 40.

Housing 36 is provided to support and orient the other components of sensor 32. In accordance with one aspect of the present teachings, housing 36 may be made from plastic such as a thermoset elastomer and is over molded onto the components of instrument 38 and onto springs 40. By over molding housing 36 onto springs 40, sensor 32 itself incorporates a mechanism for retaining sensor 32 within sensor mounting block 34 and eliminates the need for a separate clamping sleeve as in conventional wheel speed sensor assemblies. Further, housing 36 replaces the stainless steel metal can found on conventional speed measurement instruments resulting in additional cost savings relative to conventional sensors. Housing 36 is a unitary (one-piece) structure and may be disposed about a longitudinal axis 42. In the illustrated embodiment, one part 44 of housing 36 defines a connector configured to receive an electrical conductor such as a cable 46 used to transmit signals generated by instrument 38 to a controller and/or other destinations. In other embodiments, however, sensor 32 may transmit signals wirelessly. Upon installation within mounting block 34, part 44 of housing 36 faces away from exciter ring 30. Another part 48 of housing 36 is configured to receive speed measurement instrument 38 therein. Upon installation within mounting block 34, part 48 of housing 36 faces exciter ring 30.

Speed measurement instrument 38 is provided to generate a signal indicative of the rotational speed of exciter ring 30 and, therefore, the vehicle wheel. In the illustrated embodiment, instrument 38 comprises a passive wheel speed sensor that generates signals when current is generated in a wound coil as a result of magnetic induction occurring in response to movement of exciter ring 30. It should be understood, however, that instrument 38 may alternatively comprise an active wheel speed sensor that generates signals by modulating an existing current as a result of magnetic resistance occurring in response to movement of exciter ring 30. An exemplary active wheel speed sensor may include a speed measurement instrument comprising a magneto-resistive integrated circuit formed on a printed circuit board or chip and a magnet that substantially surrounds the board. In the illustrated passive wheel speed sensor embodiment, instrument 38 includes a magnet 50, a pole piece 52, a bobbin 54, a coil 56 and lead wires 58.

Magnet 50 and pole piece 52 are provided to generate a magnetic field. As the teeth on exciter ring 30 move past sensor 32, the magnetic field is altered and induces an alternating current voltage in coil 56. Magnet 50 and pole piece 52 are both disposed within part 48 of housing 36 and may be disposed about, and centered about, axis 42. Magnet 50 may comprise a permanent magnet made from rare earth materials such as neodymium. Pole piece 52 is made from materials having a relatively low magnetic reluctance including ferromagnetic materials such as steel. Pole piece 52 extends from magnet 50 and terminates at a tip of sensor 32 facing exciter ring 30.

Bobbin 54 is provided to position and orient coil 56. Bobbin 54 may be made from materials having a relatively high magnetic reluctance such as plastics. Bobbin 54 is annular in shape and may disposed about, and centered about, axis 42. An inner diameter of bobbin 54 is sized to receive pole piece 52 therein. An outer diameter supports coil 56.

Coil 56 is provided to generate current responsive to changes in the magnetic field produced by magnet 50 and pole piece 52 that result from the movement of exciter ring 30. As noted above, when the teeth on exciter ring 30 move past sensor 32, the magnetic field generated by magnet 50 and pole piece 52 is altered, thereby inducing an alternating current voltage in coil 56. The voltage cycles as each tooth on exciter ring 30 and gap between two adjacent teeth pass the sensor 32. The frequency of the cycles is indicative of the rotational speed of the exciter ring 30 and wheel hub 26 and, therefore, the vehicle wheel. The frequency and magnitude of the of the AC voltage is proportional to the speed of rotation of the exciter ring 30 and, therefore, the wheel hub 26 and vehicle wheel. Coil 56 is coupled to lead wires 58 which may in turn be coupled to an electrical conductor such as cable 46 in order to provide information to a controller such as a microprocessor or application specific integrated circuit (ASIC). Coil 56 is supported on bobbin 54 and is disposed about pole 52.

Lead wires 58 transmit signals from coil 56 to cable 46 or another electrical conductor. Lead wires may extend from an end of coil 56 in part 48 of housing 36 to a terminal point in part 44 of housing 36 where they are coupled to the conductor.

Figure 5:
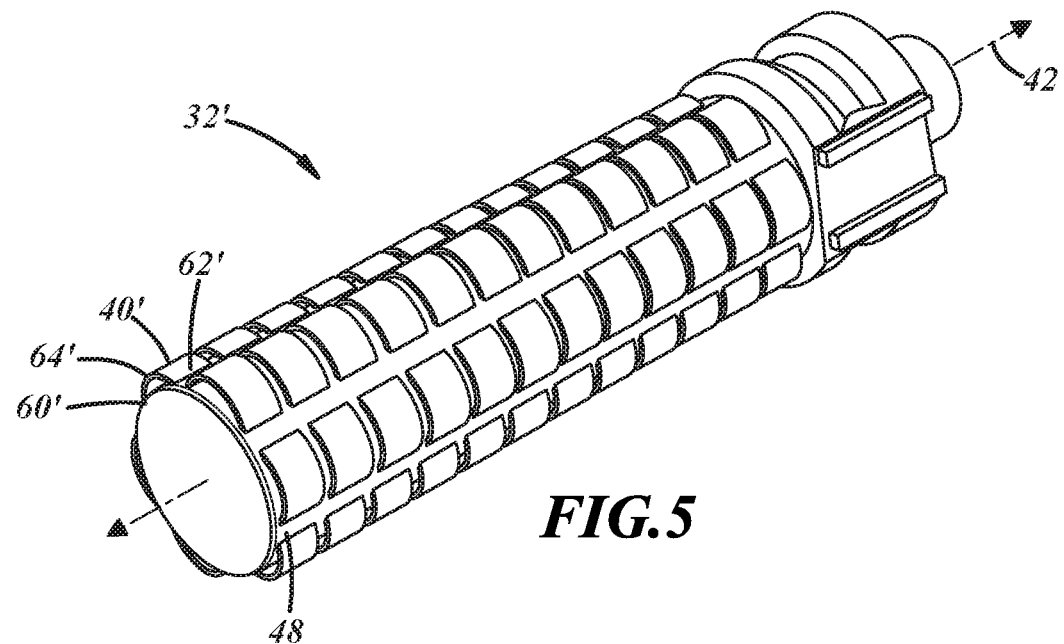
FIG. 5 is a perspective view of another embodiment of a wheel speed sensor.
Figure 7:
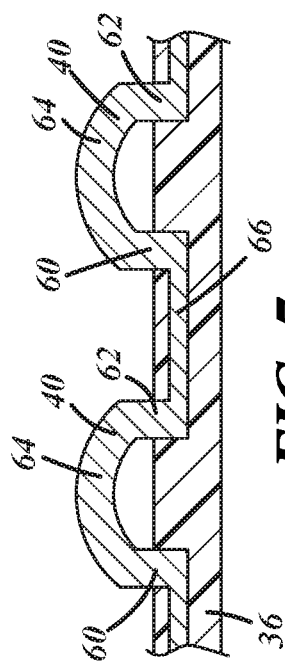
FIG. 7 is an enlarged cross-sectional view of a portion of another embodiment of a wheel speed sensor.
Figure 6:
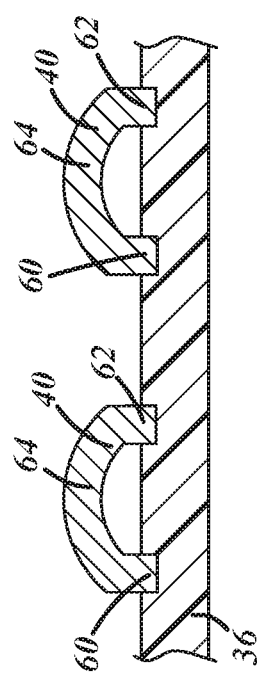
FIG. 6 is an enlarged cross-sectional view of a portion of the wheel speed sensor of FIG. 3.

Springs 40 are provided to establish a friction fit between sensor 32 and the walls of the opening in sensor mounting block 34. In one embodiment, springs 40 are made from stainless steel. In accordance with one aspect of the present teachings, housing 36 is simultaneously over molded onto instrument 38 and springs 40 such that the resulting sensor 32 can be secured within mounting block 34 without the use of a clamping sleeve. Springs 40 are mounted in part 48 of housing 36 and project radially outwardly from part 48. Upon insertion of sensor 32 into mounting block 34, at least a subset of springs 40 engage a surface of the opening in mounting block 34 in which sensor 32 is inserted. The spring force generated by springs 40 is set to inhibit movement of sensor 32 within mounting block 34 following installation, but to allow limited and temporary displacement within mounting block 34 upon application of a force to sensor 32 resulting from contact with exciter ring 30 during operation due to wheel end runout in order to prevent damage to sensor 32. Springs 40 are also arranged in specific patterns to provide a uniform distribution of the friction force between the sensor 32 and mounting block 34 as the sensor 32 is inserted into mounting block 34. Referring to FIG. 3, in one embodiment, springs 40 are arranged in a helical or spiral pattern about part 48 of housing 36. This pattern also facilitates rotation of sensor 32 during insertion into mounting block 34. In the illustrated embodiment, each turn of the helix or spiral includes six springs 40 that are equally circumferentially spaced about axis 42 such that the springs 40 in adjacent turns on the helix or spiral are aligned in six rows parallel to axis 42. It should be understood, however, that the number of springs 40 and spacing between springs 40 in each turn of the helix or spiral may vary. Referring to FIG. 5, in another embodiment a sensor 32' has springs 40' arranged in a plurality of circles on part 48 of housing 36 that are centered about axis 42. In the illustrated embodiment, each circle includes six springs 40' that are equally circumferentially spaced about axis 42, but it should be understood that the number of springs 40' may vary. Further, although the springs 40' in the circles are aligned in rows parallel to axis 42 in the illustrated embodiment, it should be understood that the springs 40' in one circle may be circumferentially offset from the springs 40' in an adjacent circle. Springs 40 or 40' may also be arranged in other patterns including a "zig-zag" pattern in which springs 40 or 40' are arranged in parallel lines along axis 42, but the springs 40 or 40' in one line are axially offset from the springs 40 or 40' in an adjacent line along axis 42 so as to form a path that moves back and forth between the lines along axis 42 at one or more acute angles. Each spring 40 or 40' has ends 60, 62 or 60', 62', respectively, that are over molded by part 48 of housing 36 and an intermediate section 64 or 64', respectively, between the ends 60, 62 or 60', 62' that is spaced from a radially outer surface of housing 36 and biased radially outward such that the spring 40 or 40' deflects radially inwardly upon insertion into sensor mounting block 34 and creates a friction force between sensor 32 or 32' and the surface of the opening in mounting block 34. Referring to FIG. 3, in sensor 32, the ends 60, 62 of each individual spring 40 are axially spaced from one another. Referring to FIG. 5, in sensor 32', the ends 60', 62' of each individual spring 40' are circumferentially spaced from one another. As shown in FIGS. 3 and 5, the intermediate section 64 or 64' of each one of the plurality of springs 40 or 40' is separated from the intermediate section 64 or 64' of every other one of the plurality of springs 40 or 40' in axial and circumferential directions by a portion of the first part 48 of the housing 36. Referring to FIG. 6, springs 40 and 40' may be formed as individual elements. Referring to FIG. 7, in an alternate embodiment, a plurality (or even all) of springs 40 or 40' may be formed from as a unitary structure such that an end 60 or 60' of one spring 40 or 40' is connected to an end 62 or 62' of another spring 40 or 40' by a connecting section 66 of the structure that is also over molded by part 48 of housing 36.

Figure 8:
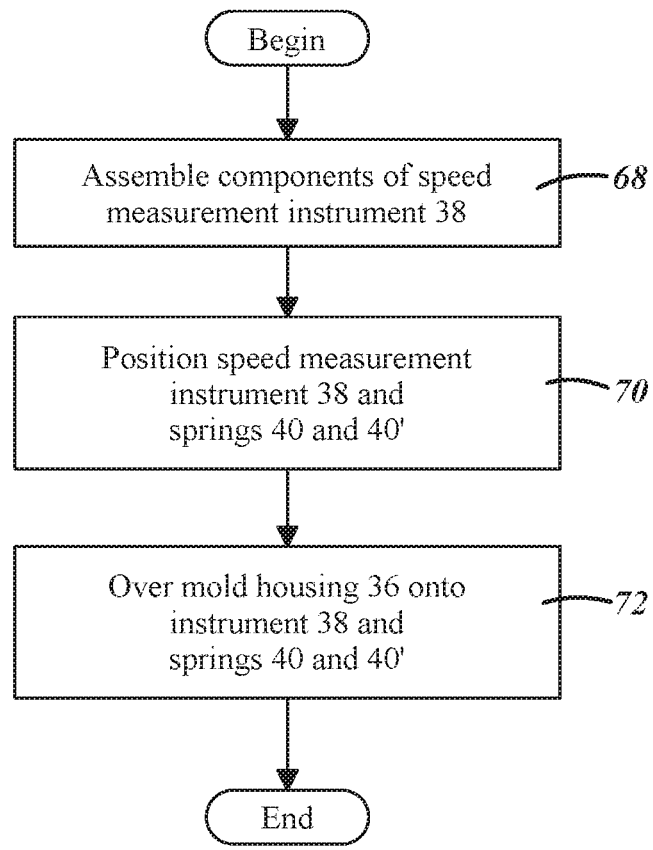
FIG. 8 is a flow chart diagram illustrating one embodiment of a method of forming a wheel speed sensor.

Referring now to FIG. 8, a method of forming wheel speed sensor 32 or 32' will be described. The method may begin with the step 68 of assembling the components of speed measurement device 38 including positioning the components of speed measurement device 38 relative to one another. In the case of the passive speed sensor embodiment illustrated in FIG. 4, step 68 may include the substeps of winding coil 56 onto bobbin 54 and locating magnet 50 and pole piece 52 relative to the wound bobbin 54 to form speed measurement instrument 38. In step 70, instrument 38 and springs 40 or 40' are positioned in a fixture such that the springs 40 or 40' surround instrument 38 and the springs 40 or 40' are spaced from one another. Finally, in step 72, a plastic material is over molded onto the speed measurement instrument 38 and springs 40 or 40' to form a wheel speed sensor 32 or 32'. As noted above, the resulting sensor 32 or 32' will have a housing 36 having a longitudinal axis 42. The housing 36 is configured to receive the speed measurement instrument 38 therein. The housing 36 will also mount the springs 40 or 40' such that the springs 40 or 40' project radially outwardly from housing 36 for engagement with a surface of an opening in a sensor mounting block 34 proximate an exciter ring 30 upon insertion of the housing 36 into the opening and each of the springs 40, 40' has first and second ends 60, 62 or 60', 62' over molded by the housing 36 and an intermediate section 64 or 64' between the first and second ends 60, 62 or 60', 62' spaced from a radially outer surface of the housing 36.

A wheel speed sensor 32 or 32' in accordance the present teachings represent an improvement as compared to conventional wheel speed sensors. In particular, the sensor 32 or 32' eliminates the need for a separate clamping sleeve to maintain the position of the sensor 32 or 32' within the sensor mounting block 34. As a result, the sensor 32 or 32' may reduce costs associated with design, manufacturing and inventory management of the sensor relative to conventional designs. Further, the sensor 32 or 32' facilitates more rapid installation of the sensor 32 or 32' by installers who no longer need to install a separate clamping sleeve prior to installation of the sensor 32 or 32'. The sensor 32 or 32' also eliminates the problem of removing old, and oftentimes corroded, clamping sleeves when it is necessary to replace a sensor thereby facilitating maintenance of the sensors and insuring more consistent sensor operation of the sensor.

While the invention has been shown and described with reference to one or more particular embodiments thereof, it will be understood by those of skill in the art that various changes and modifications can be made without departing from the spirit and scope of the invention. For example, the over molding and clamping technology disclosed herein is not limited to wheel speed sensors, but may also be used for other sensors having similar mounting arrangements including transmission sensors and crankshaft sensors.

What is claimed is:

1. A wheel speed sensor, comprising:
    a housing having a longitudinal axis, the housing configured to receive a speed measurement instrument therein and to face an exciter ring upon insertion into an opening in a sensor mounting block spaced from the exciter ring such that the speed measurement instrument senses rotation of the exciter ring; and,
    a plurality of springs mounted in the housing and projecting radially outwardly from the housing, at least a subset of the plurality of springs configured to engage a surface of the opening in the sensor mounting block upon insertion of the housing into the opening, each of the plurality of springs having first and second ends over molded by the housing and an intermediate section between the first and second ends spaced from a radially outer surface of the housing.

2. The wheel speed sensor of claim 1 wherein the speed measurement instrument is over molded by the housing.

3. The wheel speed sensor of claim 1 wherein the housing defines a connector configured to receive an electric conductor that transmits signals generated by the speed measurement instrument.

4. The wheel speed sensor of claim 1 wherein the speed measurement instrument includes a pole piece, a magnet disposed at one end of the pole piece and a coil surrounding the pole piece.

5. The wheel speed sensor of claim 1 wherein the intermediate section of each one of the plurality of springs is separated from the intermediate section of every other one of the plurality of springs in axial and circumferential directions by a portion of the housing.

6. The wheel speed sensor of claim 1 wherein the plurality of springs are arranged in a helical pattern on the housing.

7. The wheel speed sensor of claim 1 wherein the plurality of springs are arranged in a plurality of circles on the housing.

8. The wheel speed sensor of claim 1 wherein the first and second ends of each spring of the plurality of springs are axially spaced from one another.

9. The wheel speed sensor of claim 1 wherein the first and second ends of each spring of the plurality of springs are circumferentially spaced from one another.

10. The wheel speed sensor of claim 1 wherein the first end of a first spring of the plurality of springs is connected to the second end of a second spring of the plurality of springs by a connecting section over molded by the housing.

11. A wheel speed sensor assembly, comprising:
    an exciter ring mounted to a wheel hub supporting a wheel of a vehicle; and,
    a wheel speed sensor mounted in an opening in a sensor mounting block on an axle supporting the wheel hub, the wheel speed sensor including
        a housing having a longitudinal axis, the housing configured to receive a speed measurement instrument therein and facing, and spaced from, the exciter ring such that the speed measurement instrument senses rotation of the exciter ring; and,
        a plurality of springs mounted in the housing and projecting radially outwardly from the housing, at least a subset of the plurality of springs engaging a surface of the opening in the sensor mounting block, each of the plurality of springs having first and second ends over molded by the housing and an intermediate section between the first and second ends spaced from a radially outer surface of the housing.

12. The wheel speed sensor assembly of claim 11 wherein the speed measurement instrument is over molded by the housing.

13. The wheel speed sensor assembly of claim 11 wherein the housing defines a connector configured to receive an electric conductor that transmits signals generated by the speed measurement instrument.

14. The wheel speed sensor assembly of claim 11 wherein the speed measurement instrument includes a pole piece, a magnet disposed at one end of the pole piece and a coil surrounding the pole piece.

15. The wheel speed sensor assembly of claim of claim 11 wherein the intermediate section of each one of the plurality of springs is separated from the intermediate section of every other one of the plurality of springs in axial and circumferential directions by a portion of the housing.

16. The wheel speed sensor assembly of claim 11 wherein the plurality of springs are arranged in a helical pattern on the housing.

17. The wheel speed sensor assembly of claim 11 wherein the plurality of springs are arranged in a plurality of circles on the housing.

18. The wheel speed sensor assembly of claim 11 wherein the first and second ends of each spring of the plurality of springs are axially spaced from one another.

19. The wheel speed sensor assembly of claim 11 wherein the first and second ends of each spring of the plurality of springs are circumferentially spaced from one another.

20. The wheel speed sensor assembly of claim 11 wherein the first end of a first spring of the plurality of springs is connected to the second end of a second spring of the plurality of springs by a connecting section over molded by the housing.

21. A method of forming a wheel speed sensor, comprising the steps of:
    positioning a speed measurement instrument and a plurality of springs within a fixture such that the plurality of springs surround the speed measurement instrument and each of the plurality of springs is spaced from every other one of the plurality of springs; and,
    over molding the speed measurement instrument and the plurality of springs to form a wheel speed sensor having a housing having a longitudinal, the housing receiving the speed measurement instrument therein and mounting the plurality of springs such that the plurality of springs project radially outwardly from the housing for engagement with a surface of an opening in a sensor mounting block proximate an exciter ring upon insertion of the housing into the opening, each of the plurality of springs having first and second ends over molded by the housing and an intermediate section between the first and second ends spaced from a radially outer surface of the housing.

* * * * *

UNITED STATES PATENT AND TRADEMARK OFFICE
CERTIFICATE OF CORRECTION

PATENT NO. : 10,871,501 B2
APPLICATION NO. : 16/220042
DATED : December 22, 2020
INVENTOR(S) : Nianqing Zhou, Daniel Peter Zula and Jack Dunlap Mason Page 1 of 1

It is certified that error appears in the above-identified patent and that said Letters Patent is hereby corrected as shown below:

In the Claims

In Column 8, Line 52 (Claim 21), "a housing having a longitudinal," should read "a housing having a longitudinal axis,"

Signed and Sealed this
Fourth Day of May, 2021

Drew Hirshfeld
*Performing the Functions and Duties of the
Under Secretary of Commerce for Intellectual Property and
Director of the United States Patent and Trademark Office*